(12) United States Patent
Colignon

(10) Patent No.: US 6,763,658 B2
(45) Date of Patent: Jul. 20, 2004

(54) SYSTEM FOR HELPING TO REGENERATE A CATALYZED PARTICULATE FILLER ARRANGED IN A MOTOR VEHICLE DIESEL ENGINE EXHAUST LINE

(75) Inventor: Christophe Colignon, Levallois Perret (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/292,765

(22) Filed: Nov. 13, 2002

(65) Prior Publication Data

US 2003/0089104 A1 May 15, 2003

(30) Foreign Application Priority Data

Nov. 13, 2001 (FR) .............................. 01 14672

(51) Int. Cl.[7] ................................................. F01N 3/00
(52) U.S. Cl. ........................... 60/295; 60/286; 60/288; 60/311
(58) Field of Search ......................... 60/285, 286, 287, 60/288, 295, 297, 311, 274

(56) References Cited

U.S. PATENT DOCUMENTS

| | | | | |
|---|---|---|---|---|
| 4,485,621 A | * | 12/1984 | Wong et al. ................ | 60/288 |
| 4,686,827 A | * | 8/1987 | Wade et al. ................ | 60/286 |
| 5,193,340 A | | 3/1993 | Kamihara | |
| 5,746,989 A | * | 5/1998 | Murachi et al. ............. | 60/274 |
| 5,771,683 A | * | 6/1998 | Webb ....................... | 60/297 |
| 6,233,927 B1 | * | 5/2001 | Hirota et al. ............... | 60/297 |
| 6,484,495 B2 | * | 11/2002 | Minami ..................... | 60/288 |
| 6,615,580 B1 | * | 9/2003 | Khair et al. ................ | 60/286 |

FOREIGN PATENT DOCUMENTS

FR          2 774 427           8/1999

OTHER PUBLICATIONS

European Patent Office—Patent Abstracts of Japan, Publication No. 08319820, dated Dec. 3, 1996. See French search report.
European Patent Office—Patent Abstracts of Japan, Publication No. 61112716, dated May 30, 1986. See French search report.

* cited by examiner

Primary Examiner—Thomas Denion
Assistant Examiner—Tu M. Nguyen
(74) Attorney, Agent, or Firm—Westerman, Hattori Daniels & Adrian LLP

(57) ABSTRACT

This system for helping to regenerate a catalyzed particulate filter arranged in a motor vehicle diesel engine exhaust line, said filter (4) being positioned downstream of an oxidation catalyzt (3) on the output side of the engine (1), is characterized in that it has a gas bypass circuit (5) parallel to the terminals of the catalyzer (3) and fitted with means (6) for controlling the circulation of gases therein and in the catalyzer, in order, at the point when the regeneration of the particulate filter (4) is triggered, to divert a proportion of the gases laden with unburned hydrocarbons into the particulate filter (4) without passing via the catalyzer (3), so as to speed up the regeneration of the particulate filter.

17 Claims, 2 Drawing Sheets

SYSTEM FOR HELPING TO REGENERATE A CATALYZED PARTICULATE FILLER ARRANGED IN A MOTOR VEHICLE DIESEL ENGINE EXHAUST LINE

TECHNICAL FIELD

The present invention relates to a system for helping to regenerate a catalysed particulate filter arranged in the exhaust line of a motor vehicle diesel engine.

BACKGROUND TO THE INVENTION

It is known that, generally, filters of this type can be arranged in an exhaust line downstream of an oxidation catalyst on the output side of the engine.

To provide regeneration of a catalysed particulate filter it is necessary to maintain a minimum level of heat of the exhaust gases on the input side thereof, in order to trigger combustion of the particles trapped therein.

This is for example done by post-injecting fuel into the cylinders of the engine.

It is the job of these post-injections to produce a high thermic level of the gases on the output side of the engine, at the same time as ensuring the production of unburned hydrocarbons which are oxidised in the catalyser.

This catalytic oxidation of the hydrocarbons manifests itself in an increase in the thermic level of the exhaust gases on the input side of the filter positioned downstream of the catalyser.

The quantity of unburned hydrocarbons which then passes through the catalysed particulate filter is small and its oxidation by impregnating the catalysed filter does not generate exothermic heat.

It is the object of the invention to propose a system enabling the regeneration of the filter to be speeded up.

SUMMARY OF THE INVENTION

To this end, the subject matter of the invention is a system for helping to regenerate a catalysed particulate filter arranged in a motor vehicle diesel engine's exhaust line, said filter being positioned downstream of an oxidation catalyser on the output side of the engine, characterised in that it includes a gas bypass circuit parallel to the catalyser terminals and fitted with means of controlling the circulation of the gases therein and in the catalyser, in order, at the point when regeneration of the particulate filter is triggered, to divert a proportion of the gases laden with unburned hydrocarbons into the particulate filter without passing via the catalyser, so as to speed up the regeneration of the particulate filter.

Under another feature, the catalyser and the particulate filter are arranged in two separate exhaust line casings.

BRIEF DESCRIPTION OF DRAWINGS

The invention will be more readily understood from reading the description that follows, which is given solely by way of example and refers to the accompanying drawings, wherein.

DESCRIPTION OF PREFERRED EMBODIMENTS

Figure 1:
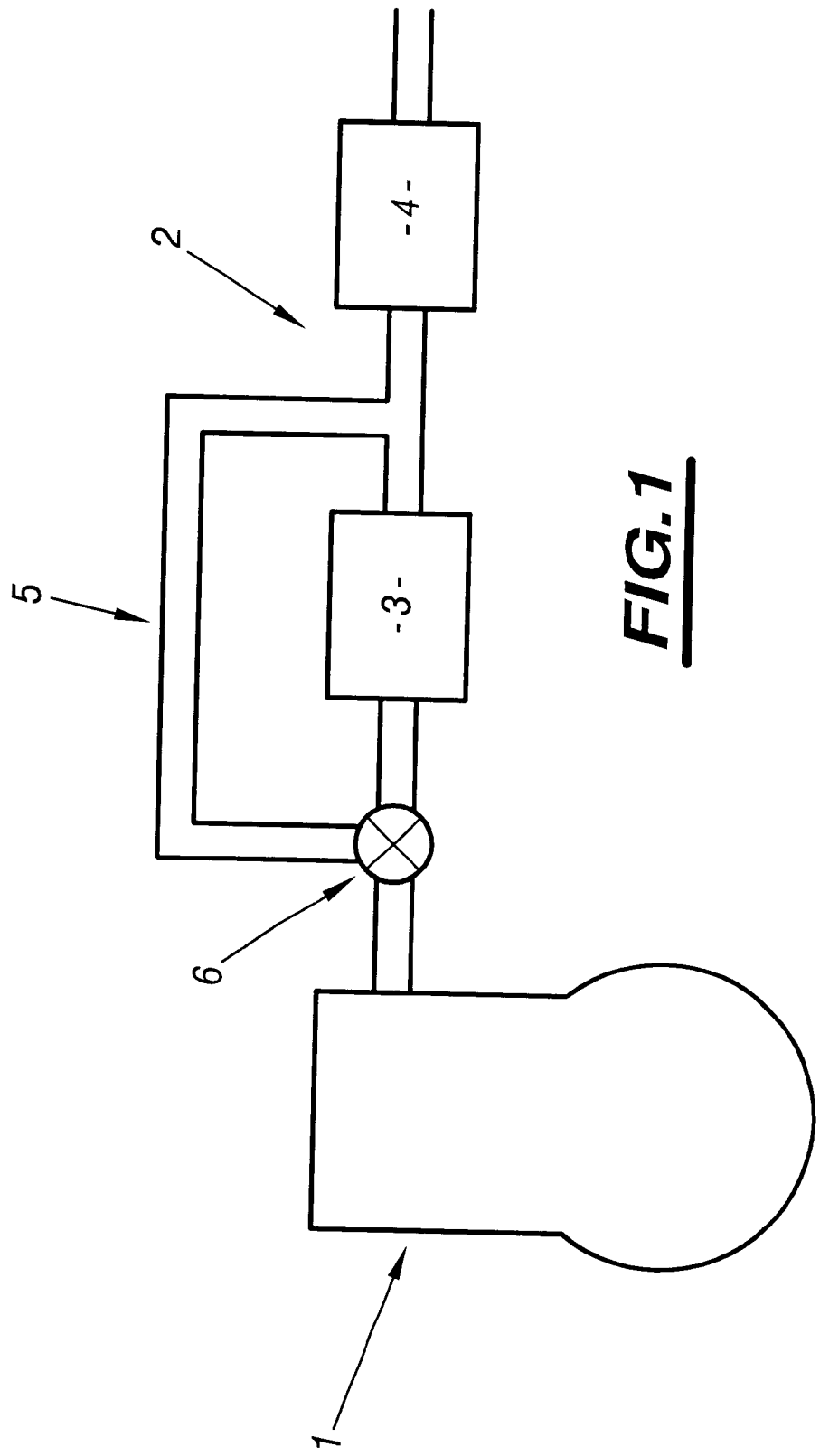
FIG. 1 shows a synoptical scheme illustrating the overall structure and the operation of a system in accordance with the invention.

FIG. 1 represents a motor vehicle diesel engine which is designated overall as 1 and the output of which is linked to an exhaust line designated overall as 2 in said Figure.

This exhaust line includes an oxidation catalyser designated overall as 3 and a catalysed particulate filter designated overall as 4, advantageously arranged in two separate casings of the exhaust line 2.

The particulate filter is arranged downstream of the catalyser.

As already indicated above, during a particulate filter 4 regeneration phase the engine, and more particularly the fuel feed system thereof, is controlled so as to provide post-injections of fuel into the engine's cylinders, in order to ensure not only a high thermic level of the exhaust gases on the output side of the engine, but also the production of unburned hydrocarbons in said gases, the intention being to oxidise these hydrocarbons in the catalyser 3.

Accordingly, this catalytic oxidation of the hydrocarbons manifests itself in an increased thermic level of the gases on the input side of the particulate filter positioned downstream of the catalyser 3.

In accordance with the invention, the system also has a gas bypass circuit designated overall as 5 in said Figure, parallel to the terminals of the catalyser 3 and fitted with means 6 for controlling the gas circulation in said catalyser and in said bypass circuit, in order, at the point when regeneration of the filter is triggered, to divert a proportion of the exhaust gases laden with hydrocarbons into the particulate filter without passing through the catalyser, so as to activate the regeneration of said catalysed particulate filter.

The operation of these controlling means is for example controlled by a suitable computer.

It will therefore be understood that a proportion of the hydrocarbons produced when fuel is post-injected into the engine's cylinders is diverted straight to the input side of the particulate filter, and is not oxidised by the catalyser positioned upstream of said filter.

These hydrocarbons therefore pass straight into the particulate filter, where they are nearly all converted, thereby limiting the quantity of pollutants discharged into the environment, but above all enabling the combustion rate of the particles trapped in said filter to be increased. Laboratory trials have accordingly shown that it was possible to double the rate of regeneration.

The remainder of the hydrocarbons, i.e. the proportion passing into the catalyser, is oxidised therein, thus creating exothermic heat that also makes it possible to increase the thermic level of the exhaust gases entering the particulate filter.

It will, of course, be readily understood that such a system may be used in association with an engine in which post-injections of fuel into the engine's cylinders are used to produce hydrocarbons, or in which these hydrocarbons are obtained by post-injecting fuel directly into the exhaust line.

Such a system is suitable for use with any motor vehicle diesel engine, whether the vehicle be of a touring, light utility or heavy goods type.

In FIG. 1, the means 6 for controlling the gas circulation in the catalyser and in the bypass circuit are constituted by a single unit arranged at the intersection of corresponding connecting conduits.

Figure 2:
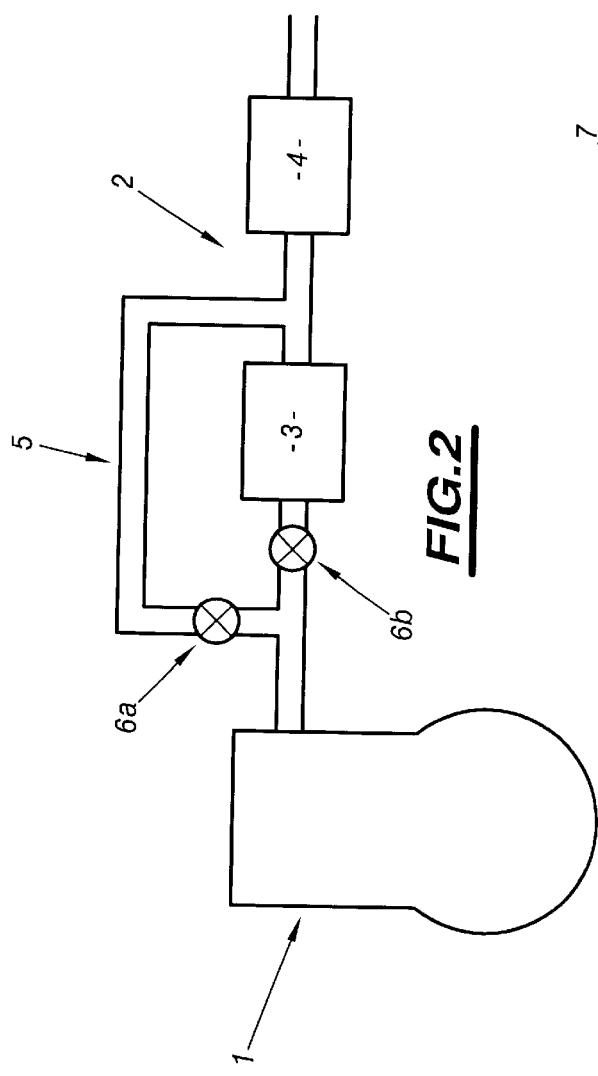
FIG. 2 shows an alternative embodiment of said system.

It will, of course, be readily understood that other embodiments may be envisaged, such as the one represented in FIG. 2, in which the single unit 6 constituting the controlling means in FIG. 1 is replaced by two throttle valves, each arranged in one of the corresponding conduits and designated as 6a and 6b, respectively.

These throttle valves may for example be proportional-control valves, which make it possible for the diverted quantity of gas to be continuously varied between 0 and 100%. The position of these throttle valves may therefore be controlled in different ways by controllers.

This is because a computer controlling the position of said throttle valves may be configured to take into account data supplied by, for example, a temperature sensor of the gases upstream of said controllers, an Hc content sensor upstream thereof, maps of predetermined positions of said throttle valves, or simulators.

Figure 3:
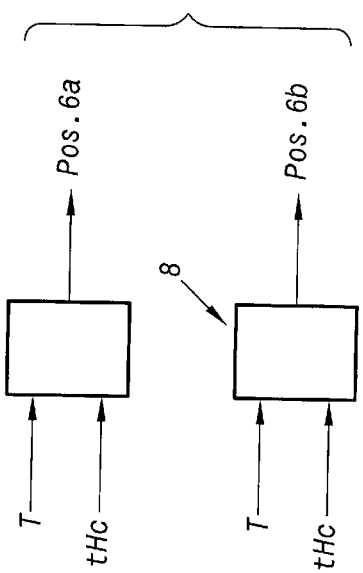
FIG. 3 shows controlling means which are part of the make-up of such a system.

One exemplary embodiment of such controllers is illustrated in FIG. 3, which shows controllers 7 and 8 of the position (6a and 6b) of the throttle valves 6a and 6b respectively, which on the input side receive temperature data T and Hc content data tHc.

By way of example, it was found that when 100% of the gases pass into the catalyser, it was possible to regenerate 12 grams of particles in the filter in 40 mins, whereas when 100% of the gases were diverted, it was possible to burn 22 grams of particles in 40 mins.

In both cases the temperature upstream of the controllers was 410° C.

What is claimed is:

1. System for helping to regenerate a catalyzed particulate filter arranged in a motor vehicle diesel engine's exhaust line, said filter being positioned downstream of an oxidation catalyzer on the output side of the engine, wherein the system includes a gas bypass circuit parallel to the terminals of the catalyzer and fitted with means of controlling the circulation of the gases therein and in the catalyzer, that, at the point when regeneration of the particulate filter is cyclically triggered, triggers diversion of a proportion of the gases laden with unburned hydrocarbons into the particulate filter without passing via the catalyzer, so as to speed up the regeneration of the particulate filter, wherein the unburned hydrocarbons are obtained by post-injecting fuel into the engine's cylinders or into the exhaust line.

2. System according to claim 1, wherein the unburned hydrocarbons are obtained by post-injecting fuel into the engine's cylinders.

3. System according to claim 1, wherein the unburned hydrocarbons are obtained by post-injecting fuel into the exhaust line.

4. System according to claim 1, wherein the position of the means for controlling the gas circulation is determined from data supplied by sensors detecting the temperature and Hc content of gases upstream thereof.

5. System according to claim 1, wherein the position of the means for controlling the gas circulation is determined from maps of predetermined positions.

6. System according to claim 1, wherein the position of the means for controlling the gas circulation is determined from simulators.

7. System according to claim 1, wherein the controlling means are associated with a computer for controlling the position of said means.

8. System according to claim 1, wherein the controlling means comprise at least one proportional control unit.

9. System according to claim 1, wherein the catalyzer and the particulate filter are arranged in two separate casings in the exhaust line.

10. System according to claim 9, wherein the unburned hydrocarbons are obtained by post-injecting fuel into the engine's cylinders.

11. System according to claim 9, wherein the unburned hydrocarbons are obtained by post-injecting fuel into the exhaust line.

12. System for helping to regenerate a catalyzed particulate filter arranged in a motor vehicle diesel engine's exhaust line, said filter being positioned downstream of an oxidation catalyzer on the output side of the engine, wherein the system includes a gas bypass circuit parallel to the terminals of the catalyzer and fitted with means of controlling the circulation of the gases therein and in the catalyzer, that, at the point when regeneration of the particulate filter is cyclically triggered, triggers diversion of a proportion of the gases laden with unburned hydrocarbons into the particulate filter without passing via the catalyzer, so as to speed up the regeneration of the particulate filter, wherein the position of the means for controlling the gas circulation is determined from data supplied by sensors detecting the temperature and Hc content of gases upstream thereof.

13. System according to claim 12, wherein the catalyzer and the particulate filter are arranged in two separate casings in the exhaust line.

14. System according to claim 12, wherein the position of the means for controlling the gas circulation is determined from maps of predetermined positions.

15. System according to claim 12, wherein the position of the means for controlling the gas circulation is determined from simulators.

16. System according to claim 12, wherein the controlling means are associated with a computer for controlling the position of said means.

17. System according to claim 12, wherein the controlling means comprise at least one proportional control unit.

* * * * *